United States Patent
Melman et al.

(10) Patent No.: US 7,170,399 B2
(45) Date of Patent: Jan. 30, 2007

(54) IMMOBILIZER COIL ATTACHMENT

(75) Inventors: Dawn Melman, Dekalb, IL (US); John Gaughan, Gilberts, IL (US)

(73) Assignee: Omron Automotive Electronics, Inc., Saint Charles, IL (US)

( * ) Notice: Subject to any disclaimer, the term of this patent is extended or adjusted under 35 U.S.C. 154(b) by 10 days.

(21) Appl. No.: 10/814,809

(22) Filed: Apr. 1, 2004

(65) Prior Publication Data

US 2005/0219141 A1 Oct. 6, 2005

(51) Int. Cl.
*B60R 25/10* (2006.01)
(52) U.S. Cl. .............................. 340/426.11; 340/425.5
(58) Field of Classification Search ................ 343/866, 343/895, 711; 340/5.72, 425.5, 426.11, 426.13; 307/10.2, 10.3, 10.5; 70/277, 278; 174/250
See application file for complete search history.

(56) References Cited

U.S. PATENT DOCUMENTS

| | | | |
|---|---|---|---|
| 4,788,613 A * | 11/1988 | Yamashita | 360/123 |
| 5,671,621 A | 9/1997 | Watanuki et al. | 70/278 |
| 6,552,655 B2 * | 4/2003 | Barbulescu | 340/426.11 |
| 2004/0145449 A1 * | 7/2004 | Yamamoto et al. | 340/5.72 |
| 2005/0104707 A1 * | 5/2005 | Rothmayer et al. | 336/208 |

FOREIGN PATENT DOCUMENTS

GB 1 071 158 * 1/2001

* cited by examiner

*Primary Examiner*—Hoang V. Nguyen
(74) *Attorney, Agent, or Firm*—Foley & Lardner LLP

(57) ABSTRACT

A method of making a device utilizes the step of winding a coil; disposing the coil in a predetermined position on a component which forms part of the device; connecting the ends of the coil to first and second pins by winding the ends of the coil onto the pins; and disposing the first and second pins in electrical connection with first and second connection structures formed on a PCB (printed circuit board) which is disposed in/on the component.

17 Claims, 5 Drawing Sheets

IMMOBILIZER COIL ATTACHMENT

BACKGROUND OF THE INVENTION

1. Field of the Invention

The present invention relates generally to an immobilzer coil such as that used in automotive applications and more specifically to a coil immobilizer arrangement/fabrication technique that facilitates manufacture of the same.

2. Description of the Related Art

In the past, coil antenna for devices such as automotive anti-theft immobilizer devices have been wound in situ on a molded body which forms part of the vehicle interior and then encased by an overmolding process. Connection pins are connected to the ends of the coil either before or after the overmolding process and are press-fitted into a plastic housing to establish an electrical connection with a PCB (printed circuit board) which is suitably arranged with the plastic housing. However, this process is very time consuming and the molds/apparatus which are used to make the molded body and remold it after the coil has been disposed in position, are very expensive, highly specialized pieces of equipment. In fact, this equipment tends to be so expensive that the manufacture of such devices, at least as far as the molding and remolding is concerned, frequently requires outsourcing to companies that specialize in the process. This increases both the direct and indirect costs of each unit. In addition, the act of inserting the pins into position can provide stress on the PCB which over time can lead to problems which attenuate the working life of the device.

SUMMARY OF THE INVENTION

The present invention is directed to providing a technique via which the manufacture of an antenna coil for device such as an immobilizer, which forms part of an automotive anti-theft device for example, is simplified, can be carried out in-house, and is rendered less expensive in terms of both direct and indirect costs.

More specifically, a first aspect of the invention resides in a method of making a device comprising: winding a coil; disposing the coil in a predetermined position on a component which forms part of the device; connecting the ends of the coil to first and second pins by winding the ends of the coil onto the pins; and disposing the first and second pins in electrical connection with first and second connection structures formed on a PCB (printed circuit board) which is disposed in/on the component.

In this method a first end of the wire which is used form the coil can be wound onto the first pin before the wire is wound into the coil.

In the above method, the component is a molded body and the steps of disposing the coil, connecting the ends of the coil to the first and second pins and the step of disposing the first and second pins in the first and second connection structure, are all carried out in the absence of overmolding of any part of the coil once disposed on the molded body.

This method also utilizes the step of soldering the ends of the coils to the pins. In addition, the step of soldering the pins to the connection structures of the PCB, is one technique of connecting the coil to the PCB.

In one embodiment, the step of soldering the ends of the coils to the pins and the step of soldering the pins to the connection structures on the PCB are carried out after the ends of the coil have been wound on the pins and the pins have been disposed in position with respect to the PCB so that the pins are in contact with the connection sites.

The step of winding the coil can comprise winding the coil on a bobbin which is separate from the component.

A further aspect of the invention resides in a method of making a device comprising: winding a coil; connecting a first end of the coil to a first pin; disposing the coil in a predetermined position on a component which forms part of the device; connecting a second end of the coil to a second pin; disposing the first pin in a first predetermined connection position on a PCB (printed circuit board) which is disposed in the device with the component; and disposing the second pin a second predetermined connection position on the PCB.

In this aspect, the step of winding the coil is carried out on a form and is then transferred to the device. The steps of connecting the first end of the coil to the first pin; connecting the second end of the coil to the second pin, disposing the first pin in the predetermined connection position and the step of disposing the second pin in the second predetermined connection position are all carried out in the absence of a molding process wherein the coil is overmolded.

In the above mentioned method, the ends of the coil are connected to the first and second pins by winding the ends of the coil onto the first and second pins. The first and second pins are then disposed in the connection positions and the first and second coil ends are soldered to the first and second pins and the first and second pins are soldered to electrical connection structures associated with the first and second connection positions.

According to one embodiment of this technique the soldering of the first and second coil ends to the first and second pins, and the soldering of the first and second pins to the first and second connection sites are all carried out while the pins are in situ in the first and second connection sites. Alternatively, the soldering can be carried out in stages. The pins can be soldered to the ends of the coils and then after suitable disposition on the PCB, the pins can be soldered in position.

A further aspect of the invention resides in a method of making a device comprising: molding first and second components; forming an antenna coil; disposing the antenna coil on the first component; and without overmolding the coil: disposing a PCB on one of the first and second components; connecting first and second ends of the coil to the PCB to establish first and second electrical connections between the coil and the PCB; and coupling the first and second components together to enclose the non-overmolded coil.

In this method, the step of connecting the first and second ends of the coil to the PCB comprises: winding a first end of the coil on a first pin; winding a second end of the coil on a second pin; disposing the first pin in a first predetermined position on the PCB; disposing the second pin in a second predetermined position on the PCB; soldering the first end of the coil to the first pin; soldering the second end of the coil to the second pin; soldering the first pin to a first connection structure on the PCB; and soldering the second pin to a second connection structure on the PCB.

Yet another aspect of the invention resides in a device comprising: first and second molded components; a non-overmolded antenna coil which is disposed on one of the first and second molded components; a PCB which is disposed with one of the first and second molded components and is connected to the antenna coil via first and second pins which respectively have first and second ends of the coil wound therearound and soldered thereto, and wherein the first and second pins are soldered and/or friction fitted to first and second connection structures on the PCB.

In this device the first and second molded components couple together to enclose the non-overmolded antenna coil. In addition, the PCB is enclosed by the intercoupled first and second molded components. The device can take the form of an antitheft device for an automotive vehicle.

BRIEF DESCRIPTION OF THE DRAWINGS

The various features and advantages of the present invention will become more clearly understood as a detailed description of the exemplary embodiments is given with reference to the appended drawings wherein.

DETAILED DESCRIPTION OF THE EXEMPLARY EMBODIMENTS

Figure 1:
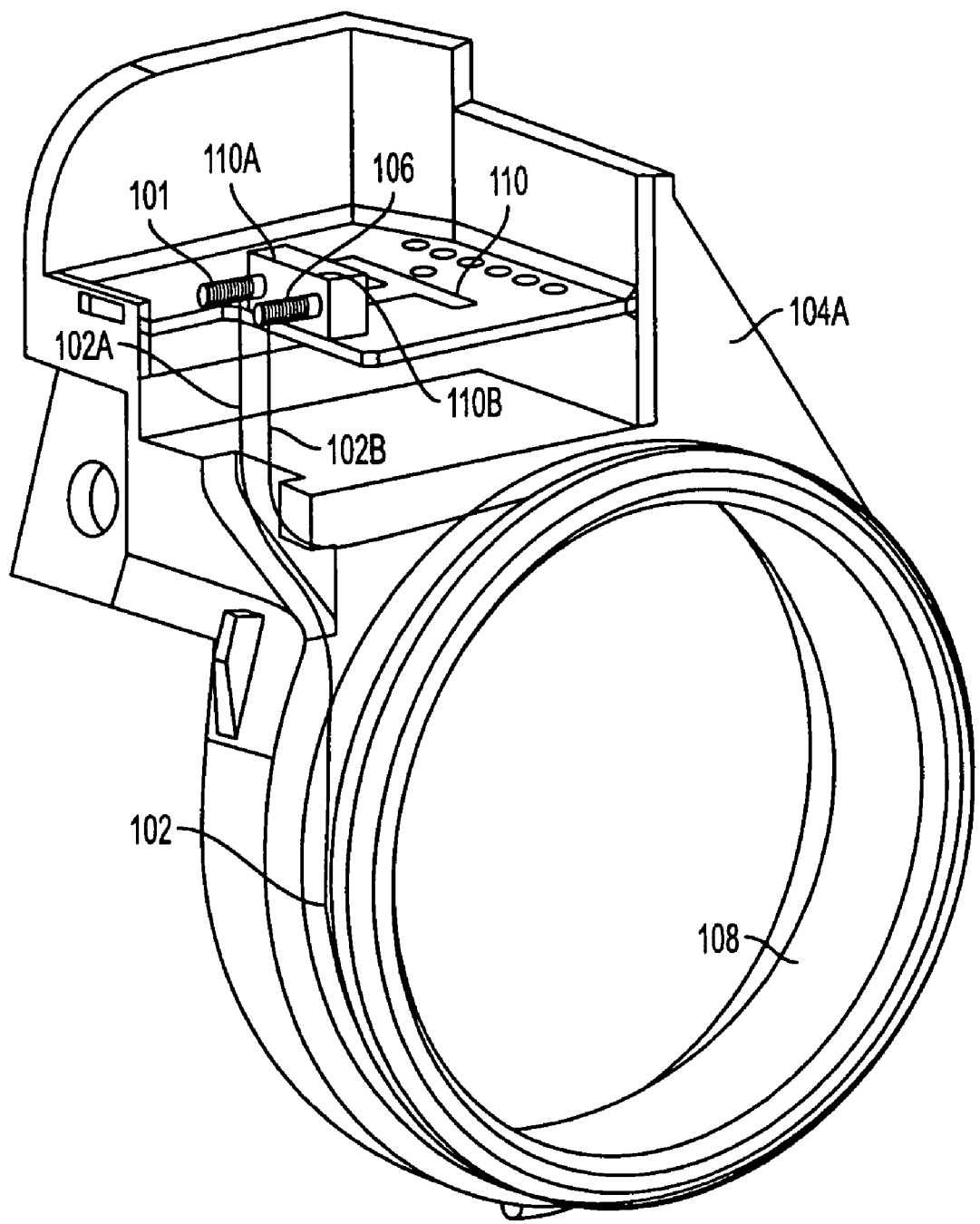
FIG. 1 is a perspective view showing an antenna coil disposed on a first molding/PCB board arrangement in accordance with a disposition technique according to the present invention.
Figure 2:
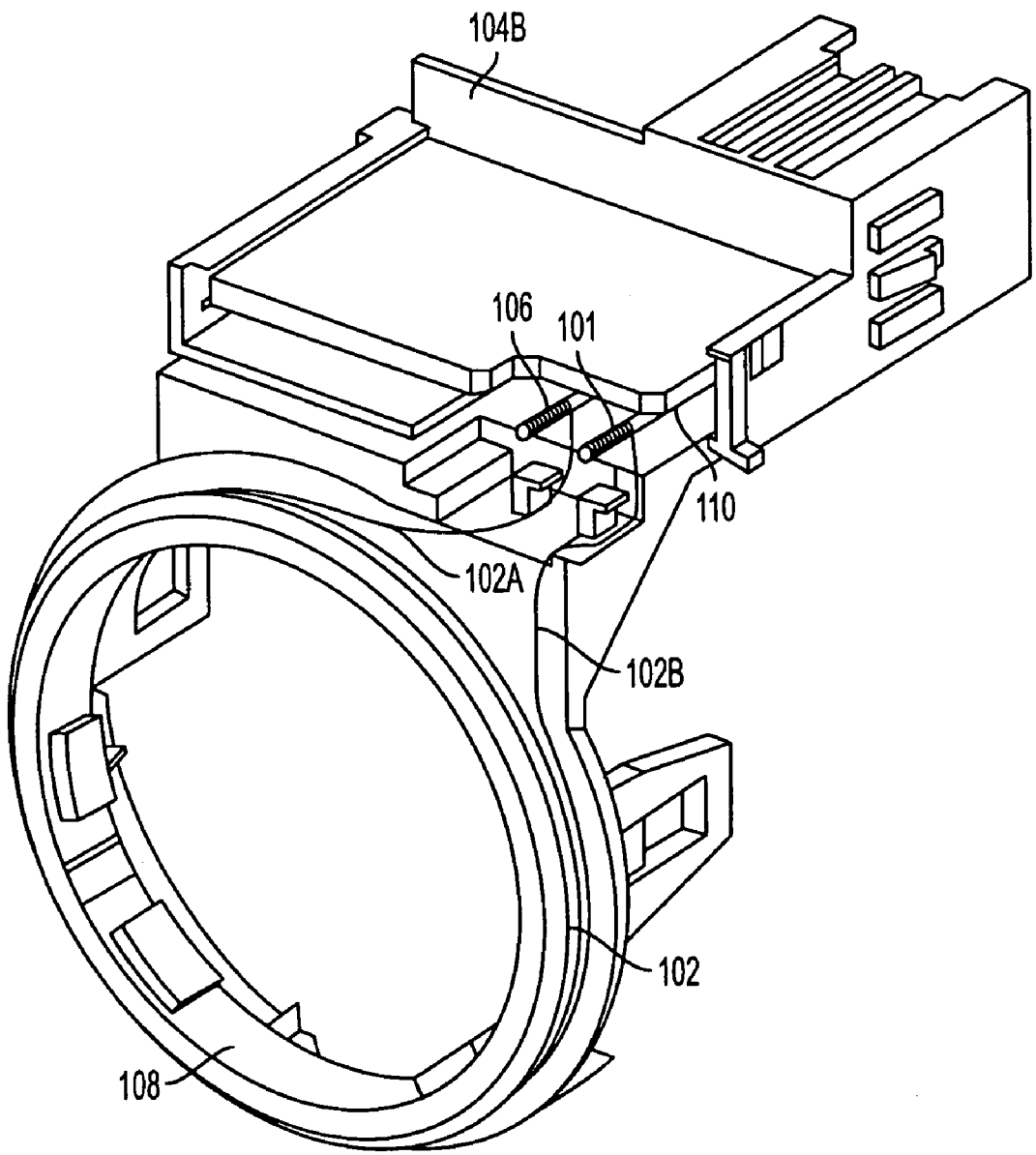
FIG. 2 is a perspective view showing an antenna coil disposed on a second molding/PCB board arrangement, in accordance with the disposition technique which characterizes the invention.
Figure 3:
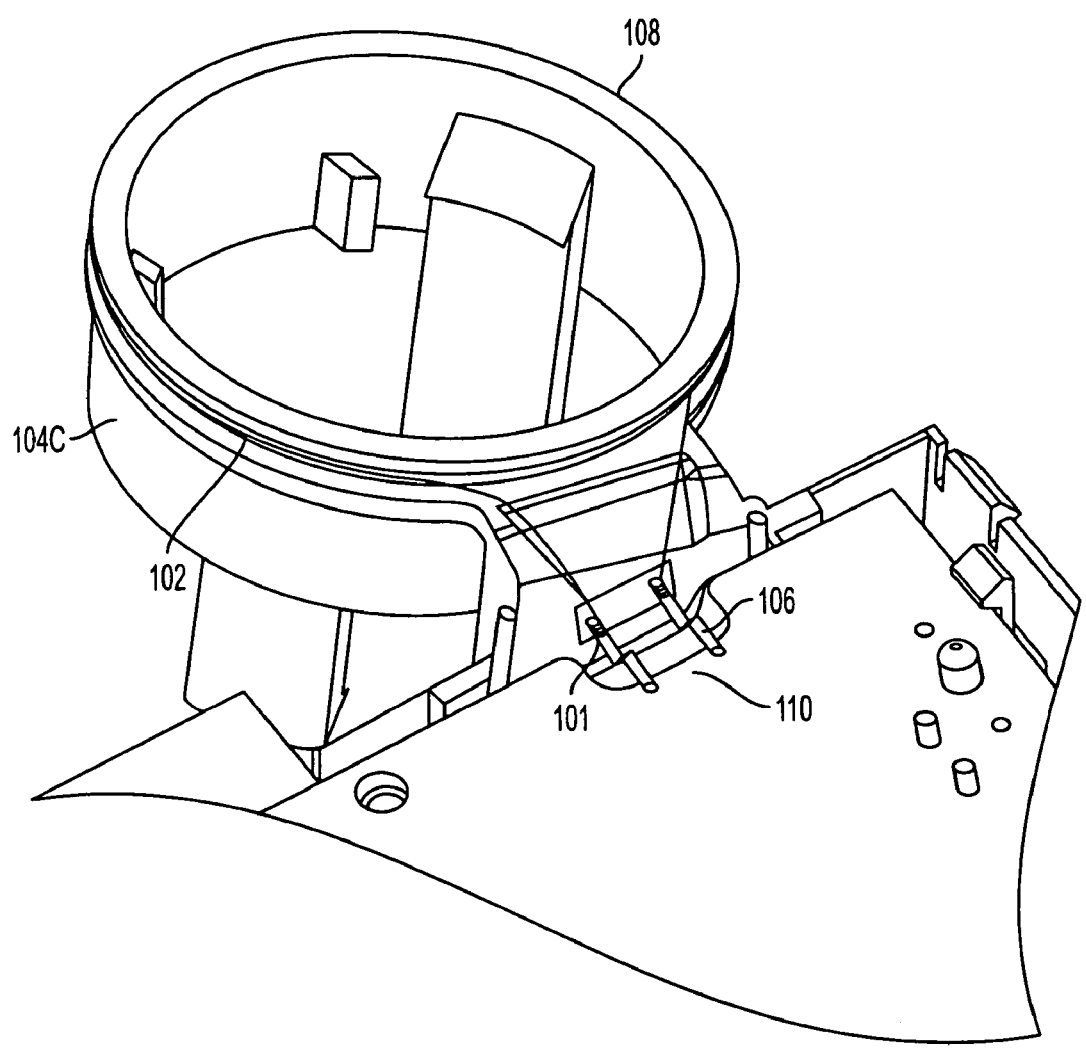
FIG. 3 is a perspective view showing an antenna coil disposed on a third molding/PCB board arrangement in accordance with the disposition technique according to the present invention.

A first embodiment of the invention resides in a technique wherein one end of a length of wire has been wound onto a first connection pin 101, and then wound around a form (such as bobbin not shown) to form a coil 102 having an inner diameter which is suitable for disposition on a molded component 104 such as that illustrated any of FIGS. 1–3. The free end of the coil 102 is then wound onto a second pin 106. The coil 102 is then disposed about the circular flange 108 on the molded body. The two pins 101, 106 are then disposed in/or connection sites/structures such as 110A and 110B provided on a PCB (printed circuit board) 110 in the manner shown in any of FIGS. 1–3, for example. The pins 101, 106, coil ends 102A, 102B and connection sites/structures 110A, 110B are then interconnected by soldering.

Figure 4:
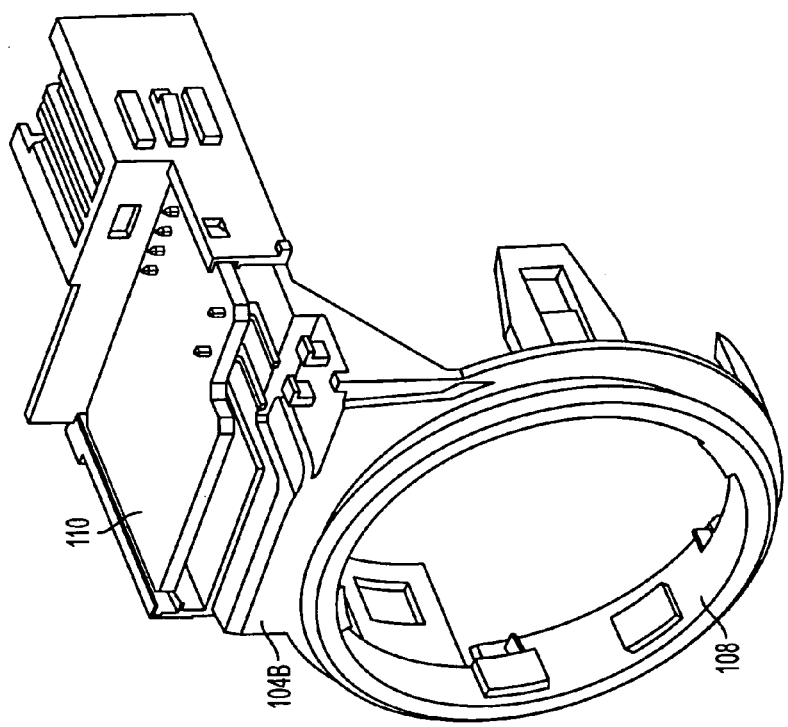
FIG. 4 is an exploded view showing the first molding/PCB board arrangement, depicted in FIG. 2, prior to the disposition of the antenna coil and showing a second molding which can be coupled with the first one in order to enclose the antenna and PCB after the disposition of the antenna in accordance with the disposition technique according to the present invention.
Figure 4:
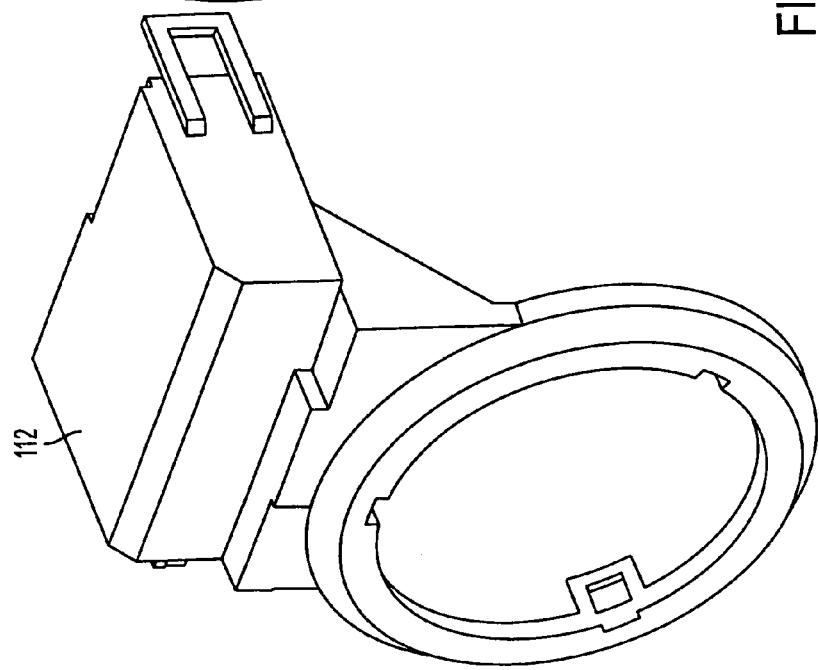

Following this, a second molding or cover member 112 such as depicted in FIG. 4 can be disposed over the coil 102 and PCB 110 to enclose the same.

While the first embodiment is such as to firstly connect one end of the wire which is to become the coil to a first pin, wind the coil and then connected the free end of the coil to the second pin, the invention is not so limited and various modifications can be envisaged without departing from the scope of the invention which is limited only by the appended claims. For example, in accordance with a second embodiment it is possible to wind a length of wire about the bobbin and then wind the ends of the coil about first and second connection pins 101, 106. This can be followed by a transfer of the coil and pins to a molded component such as those illustrated in FIGS. 1–3 and the pins connected to the PCB.

Further embodiments of the invention reside in the manner/timing with which the pins 101, 106 are connected to the PCB 110 and the timing with which the soldering is carried out. For example, the pins 101, 106 can be soldered to the ends 102A, 102B of the coil 102, before the coil 102 is removed from the bobbin. The pins 101, 106 can inserted into female connection members formed on the PCB and retained in position by friction fit or can be soldered/bent to ensure a permanent connection with good electrical connectivity.

Alternatively, the pins can be laid on connection sites and soldered in place. The pins can be held in place by a jig or the like while the soldering is being carried out.

In that the pins and the ends of the coil can be arranged to lie in a relaxed state during the soldering, this latter technique tends to reduce the stresses which can accidentally be generated by the insertion (e.g. force fitting) of the pins into the female connection members/sites.

Figure 5:
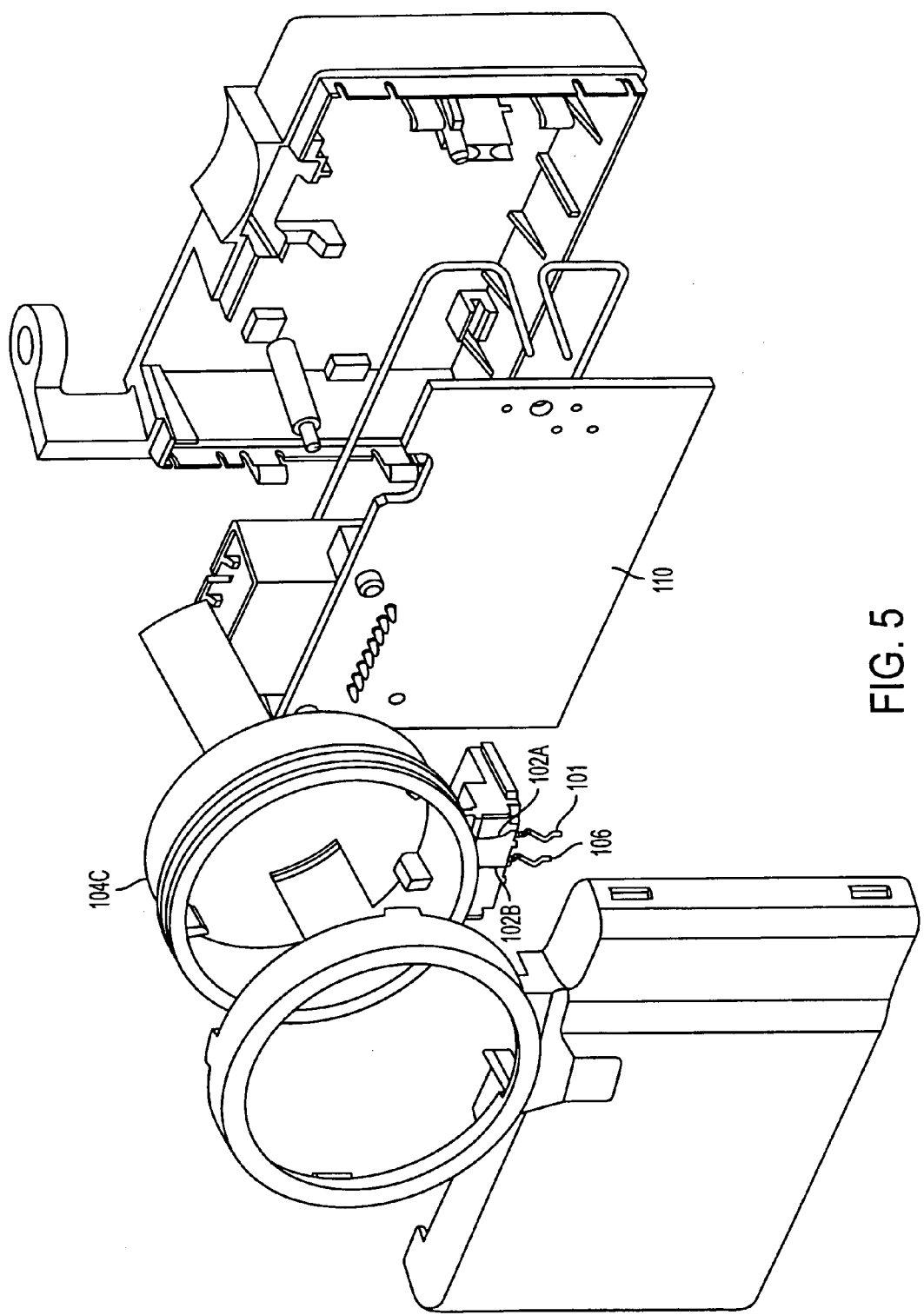
FIG. 5 is an exploded view showing the components of a device, such as an automotive anti-theft device (immobilizer) wherein an antenna coil has been disposed in accordance with the invention but is yet to be connected with connection pins and soldered to connection structures provided on the PCB.

FIG. 5 shows an example of a multi-component device which includes the molded component 104C shown in FIG. 3. As will be appreciated, in this arrangement, the coil 102 has been disposed about the circular flange 108 of the molded component and is such the free ends of the coil 102A and 102B are arranged to hang down under the component 104C. It is not outside the scope of the invention to have the pins previously disposed with or connected to the PCB 110 and to move the component to the PCB 110 and then connect the ends 102A, 102B of the coil wire to the pins. Alternatively, the ends of the wire can be coiled for form quasi pins which can be soldered or otherwise fixed in position.

While not specifically limited thereto the embodiments of the invention find advantageous application in the fabrication of an anti-theft device (immobilizer) for an automotive vehicle. The molded components shown in FIGS. 1–3 are readily adapted to fit about the key cylinder of an ignition switch so as to excite and/or be receptive of electromagnetic emissions from chips and the like types of transmitter devices which are embedded in the ignition keys.

Although the invention has been disclosed with reference to only a limited number of embodiments, the various modifications which can be made without departing form the scope of the invention, which, as noted above, is limited only by the appended claims, will be self-evident to a person of skill in the art or that which most closely related to the invention, given the preceding disclosure.

What is claimed is:

1. A method of making a device comprising:
    winding a coil;
    disposing the coil in a predetermined position on a component which forms part of the device and which is configured for use in a vehicle;
    connecting the ends of the coil to first and second pins by winding the ends of the coil onto the pins; and
    disposing the first and second pins in electrical connection with first and second connection structures formed on a PCB (printed circuit board) which is disposed on the component,
    wherein the component is a molded body and wherein the steps of disposing the coil, connecting the ends of the coil to the first and second pins and the step of disposing the first and second pins in the first and second connection structure, are all carried out in the absence of over molding of any part of the coil once disposed on the molded body.

2. A method as set forth in claim 1, wherein a first end of a wire which is used to form the coil is wound onto the first pin before the wire is wound into the coil.

3. A method as set forth in claim 1, further comprising soldering the ends of the coils to the pins.

4. A method as set forth in claim 3, soldering the pins to the connection structures of the PCB.

5. A method as set forth in claim 4, wherein the step of soldering the ends of the coils to the pins and the step of soldering the pins to the connection structures on the PCB are carried out after the ends of the coil have been wound on the pins and the pins have been disposed in position with respect to the PCB so that the pins are in contact wit the connection sites.

6. A method as set forth in claim 1, wherein the step of winding the coil comprises winding the coil on a bobbin which is separate from the component.

7. A method as set forth in claim 1, wherein the vehicle is an automotive vehicle.

8. A method of making a device comprising:
  winding an antenna coil;
  connecting a first end of the coil to a first pin;
  disposing the coil in a predetermined position on a component which forms part of the device;
  connecting a second end of the coil to a second pin;
  disposing the first pin in a first predetermined connection position on a PCB (printed circuit board) which is disposed in the device with the component; and
  disposing the second pin a second predetermined connection position on the PCB,
  wherein the step of winding the antenna coil is carried out on a form and is disposed on the device and wherein the steps of connecting the first end of the antenna coil to the first pin; connecting the second end of the antenna coil to the second pin, disposing the first pin in the predetermined connection position and the step of disposing the second pin in the second predetermined connection position are carried out in the absence of a molding process wherein the antenna coil is over molded.

9. A method as set forth in claim 8 wherein the form is a bobbin.

10. A method as set forth in claim 8, wherein the steps of connecting the ends of the antenna coil to the first and second pins by winding the ends of the antenna coil onto the first and second pins; and disposing the first and second pins in the connection positions further comprises soldering the first and second coil ends to the first and second pins and soldering the first and second pins to electrical connection structures associated with the first and second connection positions.

11. A method as set forth in claim 8, wherein the soldering of the first and second coil ends to the first and second pins and the soldering of the first and second pins to the first and second connection sites are all carried out while the pins are in situ in the first and second connection sites.

12. A method of making a device comprising:
  molding first and second components;
  forming an antenna coil;
  disposing the antenna coil on the first component; and without over molding the coil:
    disposing a PCB on one of the first and second components;
    connecting first and second ends of the coil to the PCB to establish first and second electrical connections between the coil and the PCB; and
    coupling the first and second components together to enclose the non-over molded coil.

13. A method as set forth in claim 12, wherein the step of connecting the first and second ends of the coil to the PCB comprises:
  winding a first end of the coil on a first pin;
  winding a second end of the coil on a second pin;
  disposing the first pin in a first predetermined position on the PCB;
  disposing the second pin in a second predetermined position on the PCB;
  soldering the first end of the coil to the first pin;
  soldering the second end of the coil to the second pin;
  soldering the first pin to a first connection structure on the PCB; and
  soldering the second pin to a second connection structure on the PCB.

14. A device comprising:
  first and second molded components;
  a non-over molded antenna coil which is disposed on one of the first and second molded components;
  a PCB which is disposed with one of the first and second molded components and is connected to the antenna coil via first and second pins which respectively have first and second ends of the coil wound there around and soldered thereto, and wherein the first and second pins are soldered to first and second connection structures on the PCB.

15. A device as set forth in claim 14, wherein the first and second molded components couple together to enclose the non-over molded antenna coil.

16. A device as set forth in claim 15, wherein the PCB is enclosed by the intercooler first and second molded components.

17. A device as set forth in claim 14, wherein the device comprises an antitheft device for an automotive vehicle.

* * * * *